United States Patent [19]
Bierwith

[11] 3,761,674
[45] Sept. 25, 1973

[54] ELECTROSLAG GUIDE NOZZLE

[75] Inventor: Stanton F. Bierwith, San Leandro, Calif.

[73] Assignee: Great Canadian Oil Sands, Limited, Toronto, Canada

[22] Filed: Mar. 29, 1972

[21] Appl. No.: 239,072

[52] U.S. Cl................................ 219/73, 219/76
[51] Int. Cl.................................. B23k 9/04
[58] Field of Search.................. 219/76, 73, 126

[56] References Cited
UNITED STATES PATENTS
1,977,128  10/1934  Hawkins.......................... 219/76
3,558,845  1/1971  Norcross......................... 219/73

Primary Examiner—E. A. Goldberg
Attorney—George L. Church et al.

[57] ABSTRACT

The present invention relates to a novel consumable guide nozzle suitable for use in the electroslag welding.

2 Claims, 3 Drawing Figures

PATENTED SEP 25 1973 3,761,674
FIG. I
FIG. II
FIG. III
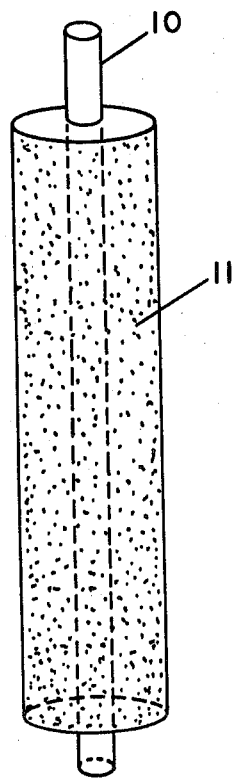
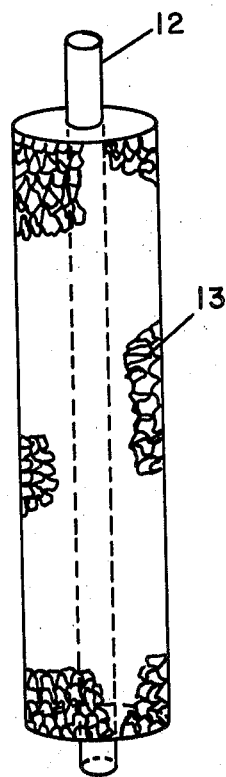
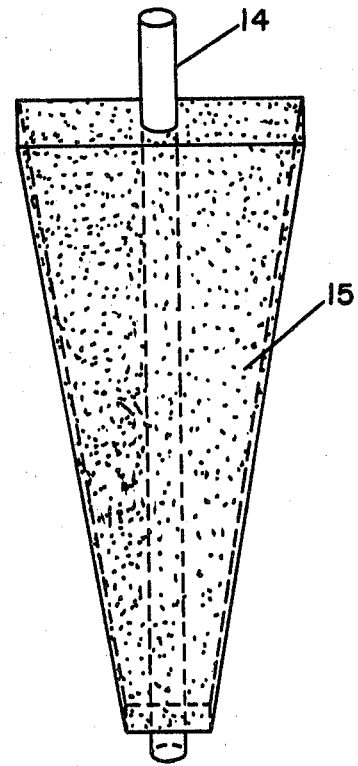

ELECTROSLAG GUIDE NOZZLE

BACKGROUND OF THE INVENTION

Electroslag welding in general is a process whereby heat is generated by passing an electric current between an electrode and a ground base to create a weld pool of the molten electrode. The passing of the current through the electrode melts the electrode to provide a weld pool suitable for fusing metal articles together. Recent developments in this area of welding techniques include the evolvement of consumable guide nozzles for use in the electroslag welding technique. A rather detailed description of the electroslag welding and a particular apparatus suitable therefore can be found in U. S. Pat. No. 3,518,397 issued June 30, 1970.

A consumable guide nozzle generally is a hollow tube through which the consumable electrode usually in the form of wire passes into the weld pool of the particular welding process being conducted. One purpose of the consumable guide nozzle is to direct the electrode wire into the welding pool of the process being conducted. The consumable guide nozzle also serves as a means for adding other metal components to the weld pool to thereby provide a final weld having a desired metallic alloy.

Many variations of consumable guide nozzles as well as consumable electrodes have been disclosed in the prior art. For example, U. S. Pat. No. 3,325,619 issued June 13, 1967 provides a consumable nozzle of a metal alloy having ceramic rings around the surface thereof to inhibit arcing to the metal workpieces which are being welded. U. S. Pat. No. 2,137,471 issued Nov. 22, 1938 and U. S. Pat. No. 3,023,130 issued Feb. 27, 1962 each provide procedures wherein the electrode itself is made up of a metal tube containing hard carbide particles. U. S. Pat. Nos. 2,345,758, 2,510,960, 2,909,778, 3,118,053, 3,215,809, 3,448,241, 3,457,388, 3,491,225, 3,531,620 and 3,534,390 each present in various forms consumable electrodes containing fine metallic particles encapsulated within a metallic shield or consumable electrodes and consumable electrode guide nozzles. These compositions generally provide an outer tubular body having fine metallic particles disposed therein. There also is usually designed a means for an electrode guide wire to pass through the consumable nozzle.

There are circumstances where it is desired to add to the metal of the consumable electrode a given quantity of other metals in order to provide a weld alloy having a given composition and thereby specific physical properties. Unfortunately, the electrodes and consumable nozzles provided by the hereinabove noted prior art are substantially made up of a solid metal tube or shell which encapsulates the metallic particles desired for the composition of the weld. Thus by following the procedures of the prior art, the amount of additives as alloys in the weld is substantially restricted to the quantity which can be placed within the metal sheaths provided.

DESCRIPTION OF THE INVENTION

The present invention is a method for preparing novel consumable guide nozzles which are comprised of fine particles of metal bound together around a guide tube. By use of the consumable guide nozzles of the present invention, a hardfacing alloy metal containing the desired components in the weld composition can be prepared. Specifically, the present invention provides a method for preparing novel guide nozzles for electroslag welding in a variety of shapes and forms and containing any metallic composition which is desired. One embodiment of the novel consumable guide nozzles of the present invention can be seen in the illustrations of FIGS. I, II and III.

Referring to FIG. I, a consumable guide nozzle comprised of guide tube 10 which can be any type steel or metal desired is surrounded by a matrix of fine particles of metals which have been compressed, shaped and baked around the surface of the tube to provide a consumable guide nozzle which when added to the melt of the consumable electrode provides a final metal alloy hardfacing composition of the desired physical characteristics.

FIG. II illustrates a consumable guide nozzle comprising metallic guide tube 12 similar to that of guide tube 10 in FIG. I wherein the composition of the metallic particles which have been fused around the guide tube can comprise particulate metallic carbides blended with other metal components to provide the surface often desired when hard surfacing by electroslag technique.

FIG. III illustrates a consumable guide nozzle having guide tube 14 similar to that of FIGS. I and II surrounded a matrix of metallic particles which can be similar to those disclosed in FIGS. I and II with the variation that the design of the guide nozzle provides that as the weld pool rises, increasing quantities of the alloy of the guide nozzle are added to the slag pool thereby providing a variation of metallurgy across the surface of the weld. This is particularly useful in hard surfacing wherein different parts of the wear surface of the workpiece require varying physical properties.

In order to more specifically define methods and compositions of the present invention, the following examples are herein presented.

Small metal particles passing through a 120 screen mesh were blended together as follows. 140 grams of ferrochorme, 8 grams of ferromanganese, 4 grams each of ferromybdenum, zirconium and titanium were blended together and added to a container of 20 milileters of 60 percent of sodium silicate in water. The metal particles were agitated in the sodium silicate until all were surface wetted. Thereafter the excess sodium silicate was drained and the etallic particles were placed in a mold having a 195 millimeter long hollow center tube having a 3½ millimeter internal diameter and a 7 millimeter outside diameter in a manner that the metal particles surrounded the outside of the tube. The composition was thereafter placed in a mold and placed in a press. The mold was subject to a pressure of 2,000 psi and was thereafter baked in an oven at 200° F. for 2 hours. At the end of the time a formed, dried consumable nozzle of the components disclosed was provided. The total weight of the consumable nozzle including the center steel guide tube was 200 grams. By way of comparison, a metal sheath was provided of the same dimensions as the previously disclosed consumable nozzle and the sheath was filled with the metallic particles of the identical compositions of that shown in the example above. The tube held a total of 75 grams of the particles whereas 160 grams of the particles were compacted in the compressed baked nozzle.

One of the specific advantages of the method of the present invention for preparing the novel consumable nozzles herein disclosed is the fact that the nozzles may be formed to any configuration which is required in order to provide the necessary hardfacing to a specific area. For example, the consumable nozzle having a 90° angle can be formed so as to provide for the surfacing of a corner of a metal object.

Thus the present invention provides a novel consumable guide nozzle suitable for use in electroslag welding comprising a central guide tube having a coating of fine metallic particles on the outer surface thereof comprsing at least 50 weight percent of the nozzle. The present invention also provides a method for preparing consumable guide nozzles suitable for use in electroslag welding comprising blending fine metallic particles with a sufficient quantity of a liquid wear hardening adhesive to wet a substantial amount of the particles, coating the outer surface of a metal guide tube having openings at both ends with the metallic particle-adhesive blend and thereafter heating the coated tube until the coating has substantially hardened.

I claim:

1. A consumable guide nozzle suitable for use in electroslag welding comprising a central hollow metallic guide tube open at both ends having a coating of fine metallic particles combined with a heat hardening adhesive and adhered to the outer surface thereof, said fine metallic particles comprising at least 50 weight percent of the whole nozzle.

2. A composition according to claim 1 wherein the heat hardening adhesive is sodium silicate.

* * * * *